United States Patent
Ahtikari (10) Patent No.: US 11,685,287 B2
(45) Date of Patent: Jun. 27, 2023

(54) ELECTRIC VEHICLE CHARGING

(71) Applicant: LIIKENNEVIRTA OY/VIRTA LTD, Helsinki (FI)

(72) Inventor: Jussi Ahtikari, Helsinki (FI)

(73) Assignee: LIIKENNEVIRTA OY / VIRTA LTD, Helsinki (FI)

( * ) Notice: Subject to any disclaimer, the term of this patent is extended or adjusted under 35 U.S.C. 154(b) by 0 days.

(21) Appl. No.: 17/311,173

(22) PCT Filed: Nov. 26, 2019

(86) PCT No.: PCT/FI2019/050840
§ 371 (c)(1),
(2) Date: Jun. 4, 2021

(87) PCT Pub. No.: WO2020/115357
PCT Pub. Date: Jun. 11, 2020

(65) Prior Publication Data
US 2022/0032812 A1   Feb. 3, 2022

(30) Foreign Application Priority Data
Dec. 5, 2018 (FI) ...................................... 20186052

(51) Int. Cl.
*B60L 53/68* (2019.01)
*B60L 53/67* (2019.01)
(Continued)

(52) U.S. Cl.
CPC ............... *B60L 53/68* (2019.02); *B60L 53/65* (2019.02); *B60L 53/66* (2019.02); *B60L 53/67* (2019.02); *H02J 13/00002* (2020.01)

(58) Field of Classification Search
CPC ... G06Q 30/0283; G06F 1/26; H02J 13/00002
See application file for complete search history.

(56) References Cited

U.S. PATENT DOCUMENTS 8,798,900 B2   8/2014   Onogi
2003/0197595 A1*  10/2003   Olson ................... G08C 17/02
340/5.21
(Continued)

FOREIGN PATENT DOCUMENTS

CN     205862214 U  *  1/2017
JP     2013-038933 A     2/2013
(Continued)

OTHER PUBLICATIONS

Search Report for Finnish U.S. Appl. No. 20/186,052 dated May 21, 2019 (1 page).
(Continued)

*Primary Examiner* — Santosh R Poudel
(74) *Attorney, Agent, or Firm* — Alston & Bird LLP (57) ABSTRACT

According to an aspect, there is provided a computing device. The computing device is configured to store user-specific data comprising information configured to set an automatic charging mode to at least one electric vehicle charging station determined by the user in a memory, the information comprising geographical coordinates of the at least one electric vehicle charging station; track geographical coordinates of the user based on geographical information received from a device of the user; detect when the user is within a predetermined distance from the at least one electric vehicle charging station by comparing the geographical coordinates of the user and the geographical coordinates of the at least one electric vehicle charging station; notify the user that a charging mode will be set to the at least one electric vehicle charging station; and send an authorized start-command to the at least one electric vehicle charging station to set the charging mode for the user.

14 Claims, 4 Drawing Sheets

(51) Int. Cl.
  *B60L 53/66* (2019.01)
  *B60L 53/65* (2019.01)
  *H02J 13/00* (2006.01)

(56) References Cited

U.S. PATENT DOCUMENTS

| | | | |
|---|---|---|---|
| 2012/0007554 A1 | 1/2012 | Kanamori et al. | |
| 2012/0130891 A1* | 5/2012 | Bogaard | B60L 53/60 705/40 |
| 2013/0132274 A1* | 5/2013 | Henderson | G06Q 20/4012 705/41 |
| 2014/0021908 A1* | 1/2014 | McCool | B60L 53/305 320/108 |
| 2014/0142770 A1 | 5/2014 | Sellschopp | |
| 2015/0077054 A1* | 3/2015 | Uyeki | B60L 58/12 320/109 |
| 2015/0224888 A1* | 8/2015 | Wild | G06Q 20/322 705/26.9 |
| 2015/0226566 A1 | 8/2015 | North et al. | |
| 2015/0286965 A1 | 10/2015 | Amano et al. | |
| 2016/0019492 A1 | 1/2016 | Juhasz et al. | |
| 2016/0092944 A1* | 3/2016 | Taylor | G06Q 10/02 705/5 |
| 2016/0213841 A1* | 7/2016 | Geismar | A61M 5/16804 |
| 2018/0170204 A1* | 6/2018 | Hell | B60L 53/305 |
| 2018/0339596 A1* | 11/2018 | Ulrich | B60L 53/60 |
| 2018/0339597 A1 | 11/2018 | Kruszelnicki | |

FOREIGN PATENT DOCUMENTS

| | | |
|---|---|---|
| JP | 2013-168054 A | 8/2013 |
| JP | 2013-185929 A | 9/2013 |
| JP | 2015-094695 A | 5/2015 |
| WO | WO-2013/057587 | 4/2013 |

OTHER PUBLICATIONS

International Search Report (ISA/EP) for PCT/FI2019/050840 dated Jan. 21, 2020, (3 pages).
Written Opinion (ISA/EP) for PCT/FI2019/050840 dated Jan. 21, 2020 (6 pages).
International Preliminary Report on Patentability (IPEA/EP) dated Dec. 3, 2020 (16 pages).
Office Action received for Japanese Patent Application No. 2021-525060, dated Oct. 4, 2022, 3 pages (English Translation only).

* cited by examiner

ELECTRIC VEHICLE CHARGING

CROSS-REFERENCE TO RELATED APPLICATIONS

The present application is a national phase entry of International Application No. PCT/FI2019/050840, filed Nov. 26, 2019, which claims priority to Finnish Application No. 20186052, filed Dec. 5, 2018, which is incorporated herein by reference in their entirety.

TECHNICAL FIELD

The present application relates to the field of electric vehicle charging, and more particularly to methods, computing devices and mobile applications configured to electric vehicle charging.

BACKGROUND

Current charging processes are mainly designed to be used with charging stations where users need to pay for charging. Hence, the charging stations and the related systems need to be able to identify the users. Also, it may be desired for some charging stations to have a restricted access, for example, when the charging station is owned by and meant only for use of members of a housing cooperative. Charging electric vehicles on the charging stations usually requires identification if the charging station is not set to a free usage mode. For example, when a user arrives at a charging station and connects the charging cable to his vehicle, the user may identify himself by either showing a RFID-card to the charging station or start charging from a mobile application. The charging station may then check from a background system if the identification is valid. Thereafter, the charging station may start the charging operation and the electric vehicle will start charging.

SUMMARY

It is an objective to provide electric vehicle charging to a user of an electric vehicle by an electric vehicle charging station. The objective is achieved by the features of the independent claims. Some embodiments are described in the dependent claims.

According to a first aspect, there is provided a computing device. The computing device is configured to store user-specific data comprising information configured to set an automatic charging mode to at least one electric vehicle charging station determined by the user in a memory, the information comprising geographical coordinates of the at least one electric vehicle charging station; track geographical coordinates of the user based on geographical information received from a device of the user; detect when the user is within a predetermined distance from the at least one electric vehicle charging station by comparing the geographical coordinates of the user and the geographical coordinates of the at least one electric vehicle charging station; notify the user that a charging mode will be set to the at least one electric vehicle charging station; and send an authorized start-command to the at least one electric vehicle charging station in response to detecting the user within the predetermined distance from the at least one electric vehicle charging station to set the charging mode for the user. An embodiment may enable more automatic preliminary charging processes without any user interaction or additional specific hardware. The automatic preliminary charging processes may be configured without any user interaction based on a location of the user.

In an embodiment, the computing device is further configured to send a command to cancel the charging mode when an input from the user is received in response to the notification. The embodiment may enable the user to cancel the charging mode in case he does not intend to charge his electric vehicle.

In an embodiment, in addition or alternatively, the authorized start-command is sent if no user input is received in response to the notification within a predetermined time limit. The embodiment may enable the charging mode not to be started if the user interacts within a given time limit after receiving the notification.

In an embodiment, in addition or alternatively, the computing device is further configured to send a command to cancel the charging mode when no electric vehicle has started charging at the electric vehicle charging station within a predetermined time limit. The embodiment may provide additional security in case the user does not arrive at the charging station. Furthermore, if the user does not start charging, for example by forgetting it, security may be provided for unauthorized charging options.

In an embodiment, in addition or alternatively, the notification comprises information that automatic charging is started in a predetermined time and an option to cancel the charging mode. The embodiment may provide information for the user about the automated processes and a possibility to opt out.

In an embodiment, in addition or alternatively, the computing device is further configured to receive information when a charging operation has stopped at the at least one electric vehicle charging station after the charging mode is set; cancel the charging mode; and determine that the user has at least once moved outside the predetermined distance from the at least one electric vehicle charging station before sending a new start command. The embodiment may provide security by not setting the charging mode unnecessarily.

In an embodiment, in addition or alternatively, the user input comprises at least one of pressing a virtual button, pressing a physical button, logging out, a voice command and tapping a screen. The embodiment may enable a convenient and intuitive way for the user to cancel the charging mode.

In an embodiment, in addition or alternatively, the at least one electric vehicle charging station is determined from a list stored in the memory, the list comprising a plurality of available electric vehicle charging stations. The embodiment may enable providing all the available alternatives for the user to determine the at least one electric vehicle charging station.

In an embodiment, in addition or alternatively, the computing device is configured to receive an input from the user to add or remove at least one electric vehicle charging station from the stored user-specific data. The embodiment may enable the user to modify his selections for allowing the automated charging mode.

In an embodiment, in addition or alternatively, the user-specific data further comprises additional parameters to allow the charging mode on the at least one electric vehicle charging station, the additional parameters comprising at least one of the predetermined distance and the predetermined time limit for the charging mode. The embodiment may enable the user to customize and add criteria to allow the automated charging mode.

In an embodiment, in addition or alternatively, the commands are sent using internet-based communications comprising at least one of open charge point protocol, OCPP, open smart charging protocol, OSCP, and protocols of different manufacturers. The embodiment may provide manufacturer independent implementations.

In an embodiment, in addition or alternatively, the coordinates are compared at predetermined intervals. The embodiment may enable detecting that the user is within the predetermined distance from the at least one charging station based on constant tracking.

In an embodiment, in addition or alternatively, the computing device is configured to track the geographical coordinates of the user using a GNSS tracking unit of at least one of the electric vehicle, a wearable of the user and the computing device. The embodiment may enable receiving the location of the user from a convenient source.

According to a second aspect, there is provided an electric vehicle charging system. The automatic electric vehicle charging system comprises the computing device of the first aspect; and at least one electric vehicle charging station communicatively coupled to the computing device of the first aspect.

According to a third aspect, there is provided a method. The method comprises storing user-specific data comprising information configured to set an automatic charging mode to at least one electric vehicle charging station determined by the user in a memory, the information comprising geographical coordinates of the at least one electric vehicle charging station; tracking geographical coordinates of the user based on geographical information received from a device of the user; detecting when the user is within a predetermined distance from the at least one electric vehicle charging station by comparing the geographical coordinates of the user and the geographical coordinates of the at least one electric vehicle charging station; notifying the user that a charging mode will be set to the at least one electric vehicle charging station; and sending an authorized start-command to the at least one electric vehicle charging station in response to detecting the user within the predetermined distance from the at least one electric vehicle charging station to set the charging mode to the user.

According to a fourth aspect, there is provided a program code configured to perform the method of the third aspect when executed on a computing device.

BRIEF DESCRIPTION OF THE DRAWINGS

The accompanying drawings, which are included to provide a further understanding of the invention and constitute a part of this specification, illustrate embodiments of the invention and together with the description help to explain the principles of the subject. In the drawings.

DETAILED DESCRIPTION

The current charging processes may not be optimal for the stations where the users charge every day. For example, it is not convenient for the user to come to his frequently used charging station and each time get a RFID-card from his pocket or to open a mobile application and press start to charge his car. An embodiment may enable the starting of the charging to be automatically processed without any user interaction based on the location of the user. For example, when the user is driving towards a charging station, a computing device may detect that the user is close to the charging station. In response to the detection, the computing device may perform preliminary processes before the user has arrived to enable automatic charging for the user at the specific station. Thus, the user may simply drive to the station, connect the charging cable, and have it start charging automatically. The embodiment may enable no additional hardware or input from the user to be required. The embodiment may provide a convenient, secure and simple way to enable electric vehicle charging.

Figure 1:
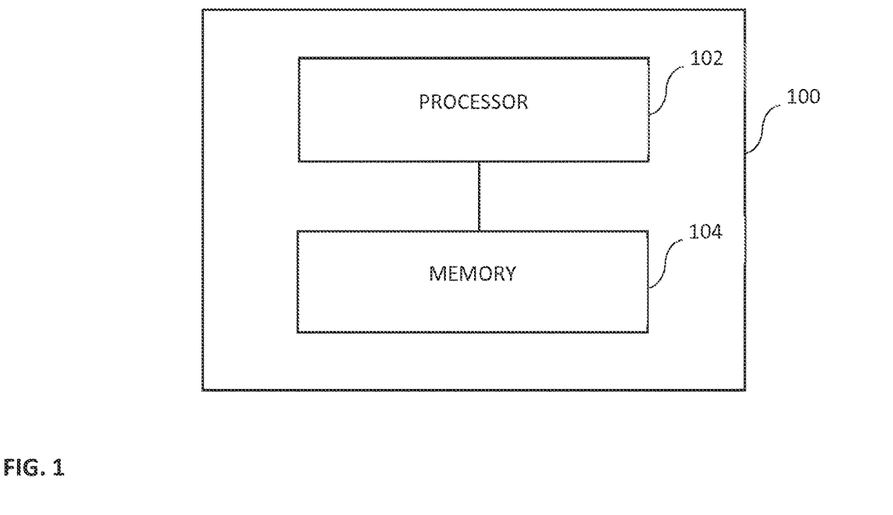
FIG. 1 illustrates a schematic representation of a block diagram of a computing device according to an embodiment.

FIG. 1 illustrates a schematic representation of a block diagram of a computing device 100 according to an embodiment. The computing device 100 may be configured to start more automatic preliminary charging operations at predetermined electric vehicle charging stations based on location information.

The computing device 100 comprises at least one processing unit 102 and at least one memory 104. The at least one memory 104 comprises program instructions which, when executed on the at least one processor 102, cause the computing device 100 to store user-specific data comprising information to set an automatic charging mode to at least one electric vehicle charging station determined by the user in the at least one memory 104. The stored information may comprise geographical coordinates of the at least one electric vehicle charging station. The automatic charging mode may be a mode in which charging may start automatically, for example by automating processes such as authentication. In other words, the automatic charging mode may comprise automating processes required before electrical energy transfer to the electrical vehicle in response to connecting a charging cable, wherein the processes are initiated without any input from a user. When the automatic charging mode is set to a charging station, the charging station may be allowed to be set to a charging mode automatically by the computing device. Further, the computing device 100 is configured to track geographical coordinates of the user based on geographical information received from a device of the user. The device may comprise in the computing device 100 or any other device of the user, such as in the electric vehicle of the user. The computing device 100 is configured to detect when the user is within a predetermined distance from the at least one electric vehicle charging station by comparing the geographical coordinates of the user and the geographical coordinates of the at least one electric vehicle charging station. When the computing device has detected that the user is within the predetermined distance from the at least one charging station, the computing device is configured to notify the user with a notification that a charging mode will be set to the at least one electric vehicle charging station. Further, the computing device is configured to send an authorized start-command to the at least one electric vehicle charging station to set the charging mode to the user. The charging mode may be, for example, a mode in which preliminary charging processes have been implemented and the charging station may be ready for charging an electric vehicle. When the charging station is ready for charging, this may mean that electric energy may be transferred to the electric vehicle as soon as the electric vehicle is wirelessly or through a charging cable connected to the charging station. The start process for charging an electric vehicle (e.g. the preliminary processes) seems automatic and convenient to the user, as there is no input required from the user. The processes needed to start charging may be processed automatically in the background and triggered based on the location of the user. The charging is started automatically in view of the user as soon as the user places a charging cable to their electric vehicle or drives to a wireless charging spot, because no input is required from the user to start the processes at the station or when he decided to go to charge at the station.

The location of the user may be tracked by the computing device 100, for example by using a GNSS tracking unit of at least one of the electric vehicle, a wearable of the user and the computing device 100. The tracked geographical coordinates of the user may be compared to the geographical coordinates of the at least one electric vehicle charging station at predetermined intervals. The geographical coordinates may be compared, for example constantly, every 30 seconds or once a minute to detect when the user is within a predetermined distance of the at least one electric vehicle charging station. In response to the detection, the computing device 100 may send at least one of the notification to the user and the authorized start-command to the at least one charging station. The computing device 100 may send the commands using internet-based communications comprising at least one of open charge point protocol, OCPP, open smart charging protocol, OSCP, and protocols of different manufacturers.

The computing device 100 may be further configured to send a command to cancel the charging mode when a user input is received in response to the notification. The notification may comprise, for example, information that the charging mode is started in a predetermined time and an option to cancel the charging mode. The user input may be received, for example, in response to the user at least one of pressing a virtual button, pressing a physical button, logging out, giving a voice command and tapping a screen. In an embodiment, the authorized start-command is sent if no user input is received in response to the notification within a predetermined time limit. The predetermined time limit may be, for example, 30 seconds or 5 minutes.

In an embodiment, the computing device 100 is configured to send a command to cancel the charging mode when no electric vehicle has started charging at the electric vehicle charging station within a predetermined time limit. The predetermined time limit may be, for example, 5 minutes or 15 minutes. The computing device 100 may receive information from the at least one electric vehicle charging station, for example if no charging cable is connected within the time limit or if no inductive charging has begun, or no vehicle has arrived on a charging spot within the time limit if the charging station is a wireless charging station. This may provide security in case the user does not arrive at the charging station. Thus, unauthorized users may be unable to charge at the expense of the authorized user.

In an embodiment, the computing device 100 is configured to receive information when a charging operation has stopped at the at least one electric vehicle charging station after the charging mode is set; cancel the charging mode; and determine that the user has at least once moved outside the predetermined distance from the at least one electric vehicle charging station before sending a new start command. The charging mode may be set only once when the user is within a predetermined distance from the charging station at one time. Hence, the charging mode may not be set or kept on unnecessarily. This may further provide additional security.

The user may determine the at least one charging station with the automatic charging mode from a list stored in the memory 104. The list may comprise all available electric vehicle charging stations. For example, the user may choose from the list one or more charging stations as his favorites. The charging stations may be chosen to be frequently used stations, such as a home station or a charging station by the user's work place. The user may be able to change the favorites. The user may be able to add or remove electric charging stations stored in the user-specific data. In other words, the user may be able to set the automatic charging mode for new charging stations of his choice and to cancel the automatic charging mode from previously selected charging stations. The user-specific data may further comprise additional parameters to allow the charging mode. The additional parameters may comprise a predetermined distance from the at least one electric charging station within which the charging mode may be set. The additional parameters may comprise a predetermined time limit for the charging mode. For example, the time limit may define the time how long the charging mode may be kept on while no electric vehicle has started charging.

Figure 2:
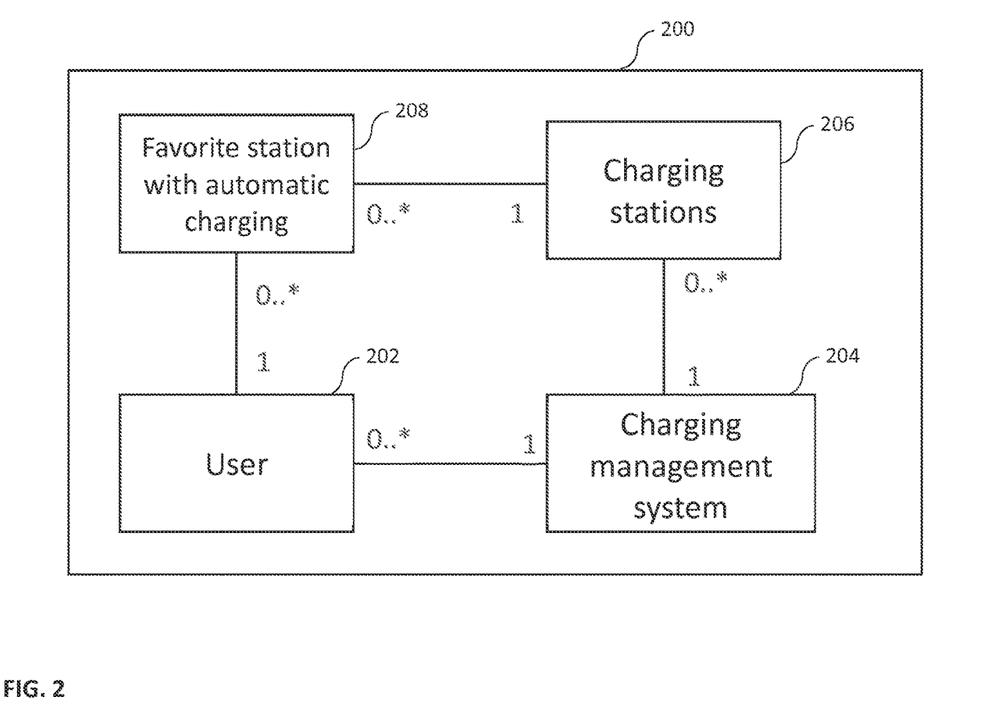
FIG. 2 illustrates a schematic representation of a block diagram of an information model of a system for automatic charging according to an embodiment.

FIG. 2 illustrates a schematic representation of a block diagram of an information model of a system 200 for automatic charging according to an embodiment.

The system 200 comprises a charging management system 204. The charging management system 204 may comprise the computing device 100 of FIG. 1. The computing device 100 may be, for example, a handheld mobile device of the user or part of an infotainment system of an electric vehicle of the user. The charging management system 204 may, for example, administrate a mobile application that runs on the computing device 100.

The charging management system 200 may receive information from one or more users 202. For example, the user 202 may have created an account on the mobile application, and the user 202 may be able to add information to the application. The charging management system 200 and the computing device 100 may store the received user-specific data in a memory. The charging management system 200 may store in the memory a list of available electric vehicle charging stations 206. The list may comprise, for example, identities, features and geographical locations of the charging stations 206. The user 202 may select from the list of charging stations 206 one or more favorite stations 208 with automatic charging. The user 202 may, for example, determine to allow the automatic charging mode on a charging station 208 located at their home or work place. The user 202 may be able to change his selections. For example, if the user 202 has set an automatic charging mode to his home charging station and he moves, he may want to cancel the automatic charging from the earlier home location and set the automatic charging mode at a charging station 208 located at the new home. The user 202 may also want to allow the automatic charging mode on new charging stations 208 he frequently starts to use.

Figure 3:
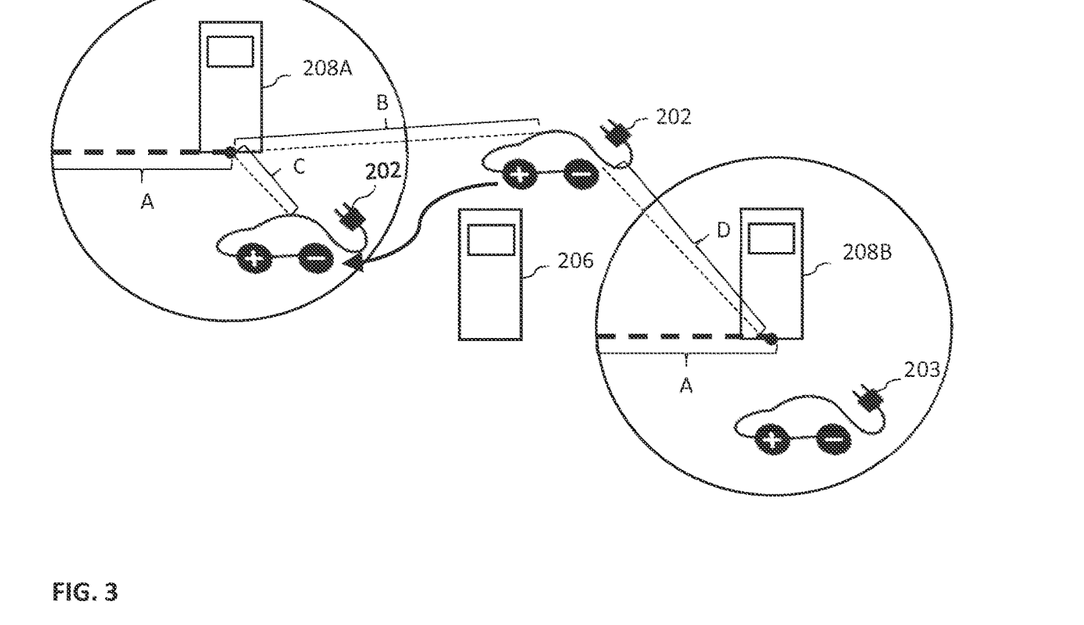
FIG. 3 illustrates a schematic representation of setting a charging mode to at least one electric vehicle charging station according to an embodiment.

FIG. 3 illustrates a schematic representation of setting a charging mode to at least one electric vehicle charging station 208A, 208B according to an embodiment.

In the example illustrated in FIG. 3, there are three electric vehicle charging stations 208A, 208B, 206. A user 202 of an electric vehicle may have set an automatic charging mode to the electric vehicle charging stations 208A and 208B. The user 202 may have set the automatic charging mode by allowing a computing device 100 (not shown in the FIG. 6) to set charging mode to the charging stations 208A, 208B determined by the user 202. The user-specific data comprising the selections of the user may be stored in a memory 104 of the computing device 100. The computing device 100 may be, for example, a mobile phone of the user. The information may comprise geographical locations of the charging stations 208A, 208B and a predetermined distance A for allowing the charging mode.

The computing device 100 may track geographical coordinates of the user 202. The geographical coordinates of the user 202 may be tracked based on geographical information received from a device of the user. For example, the computing device 100 or the electric vehicle of the user 202 may comprise a GNSS tracking unit. The computing device 100 may detect when the user 202, and thus the vehicle of the user, is within the predetermined distance A from at least one of the charging stations 208A, 208B. The computing device 100 knows the location of the user 202 and locations of the charging stations 208A, 208B and compares the locations, for example, at predetermined intervals.

For example, the user 202 may be driving in the neighborhood of the charging stations 208A, 208B and 206. Because the user 202 has selected only the charging stations 208A and 208B to have the automatic charging mode, the computing device 100 may compare the geographical coordinates of the user 202 to the geographical coordinates of the charging stations 208A, 208B. Because the charging station 206 is not selected, the charging mode is never automatically set to the station 206 based on the location of the user 202. When the distance B, D of the user 202 from the charging station 208A, 208B is determined to be longer than the predetermined distance A, no action is performed by the computing device 100 and neither of the charging stations 208A, 208B are set to charging mode. Hence, if another user 203 with an electric vehicle arrived at the charging station 208A, 208B he would be required to authenticate himself and/or provide payment information before charging is started.

After the predetermined interval, the computing device 100 may compare the geographical coordinates again. The user 202 may have now arrived within the predetermined distance A, C from the charging station 208A. The computing device 100 may then notify the user, for example, send a notification to the user 202, that the charging mode will be set to the charging station 208A, for example, in two minutes. The computing device 100 also sends an authorized start-command to the charging station 208A to set the charging mode for the user 202. When the user 202 arrives at the charging station 208A, the user 202 is already authorized, and the charging station 208A is set ready to start charging the vehicle of the user 202. No action is needed from the user 202 or special hardware required because the processes are automatically implemented based on the location information. In an embodiment, the notification may comprise an option for the user to cancel setting the charging mode, for example, if the user 202 just happens to pass by and the user 202 has no intentions to charge his vehicle. The possibility to opt out by the user, the predetermined distance for setting the charging mode, and that the charging mode may be set only for the charging stations determined by the user provide security for using the location based charging.

Figure 4:
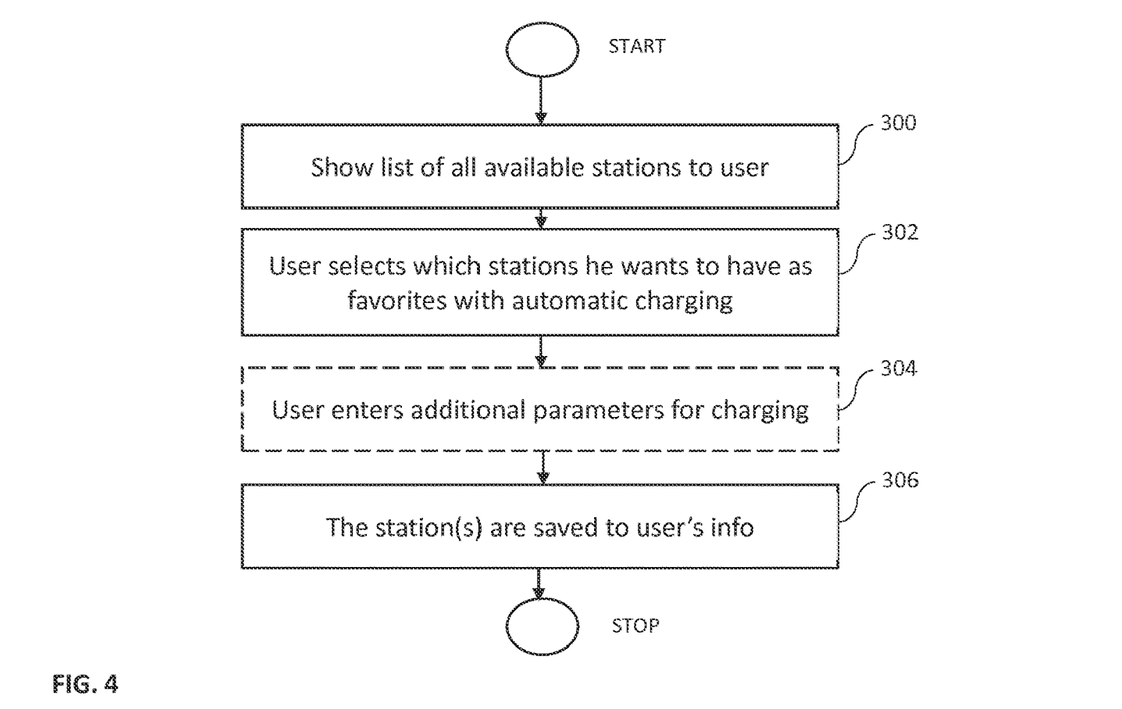
FIG. 4 illustrates a schematic representation of a program flow of a computing device when a user selects charging stations for automatic charging according to an embodiment.

FIG. 4 illustrates a schematic representation of a program flow of a computing device 100 when a user selects charging stations for automatic charging according to an embodiment.

At operation 300, the computing device 100 shows a list of all available electric vehicle charging stations 206 to a user 202. The list of all available electric vehicle charging stations 206 may be managed by an administrator of a charging management system 204. For example, the computing device 100 may receive and store an updated list of the available charging stations once a day or once a week from the administrator. The list of all available electric vehicle charging stations 206 may comprise identities and geographical locations of the electric vehicle charging stations 206. The list may be shown as a map to the user.

At operation 302, the user 202 selects which charging station or stations 208 he wants to have as favorites with automatic charging.

In an embodiment, the user 202 may also enter additional parameters for charging at operation 304. The additional parameters may comprise, for example, the range or timeout for allowing the automatic charging. The range may be a predetermined distance of, for example, 50 meters or 200 meters from the at least one charging station 208. The timeout may be, for example, 5 minutes or 15 minutes. The additional parameters entered by the user 202 may be stored in the user-specific data. In an embodiment, the additional parameters may be changed by the user 202. In an embodiment, the additional parameters may be pre-set in the memory 104 of the computing device 100.

At operation 306, the at least one charging station 208 determined by the user 202 is saved to the user's info. The computing device 100 stores the user-specific data comprising the selections. The stored data comprises information to allow and set an automatic charging mode to the one or more electric vehicle charging stations 208. The information further comprises geographical coordinates of the one or more electric charging stations 208. The geographical coordinates may be received in the list of the charging stations 206, and thus the coordinate information is also comprised in the charging station selection(s) made by the user 202.

Figure 5:
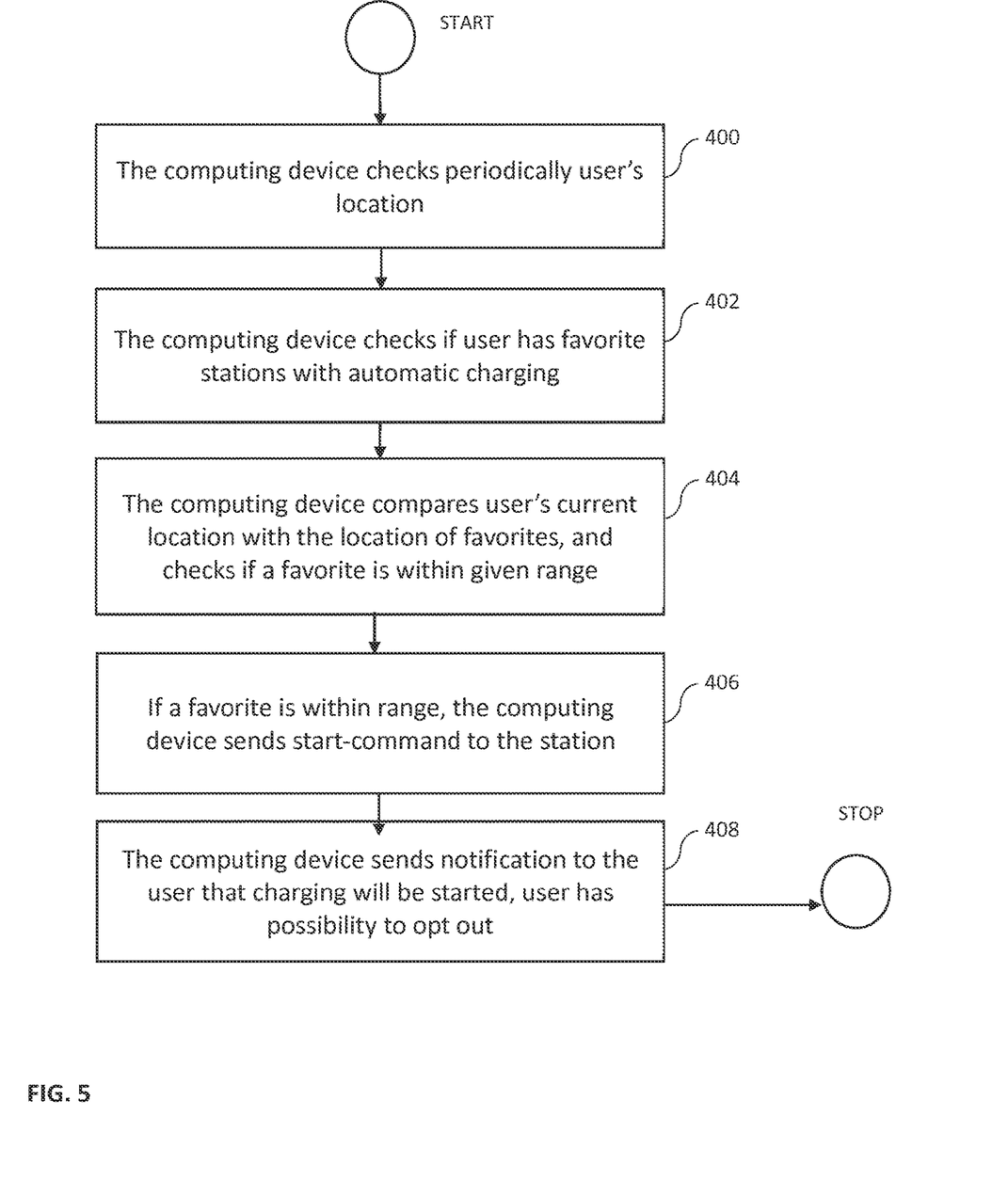
FIG. 5 illustrates a schematic representation of a program flow of a computing device to start charging automatically according to an embodiment.

FIG. 5 illustrates a schematic representation of a program flow of a computing device 100 to start a charging mode automatically according to an embodiment.

At operation 400, the computing device 100 checks periodically the user's 202 location. The computing device 100 may track the user's 202 geographical coordinates using, for example, a GNSS tracking unit such as a GPS receiver mounted in the computing device 100, a wearable of the user 202, or the electric vehicle. The location may be checked at a predetermined interval, for example every 1 minute or 5 minutes. In an embodiment, the predetermined interval may change according to a set range. For example, if the set range to allow the automating charging mode is 50 meters, the location may be checked more frequently than if the set range is 500 meters.

At operation 402, the computing device 100 checks if the user 202 has favorite stations 208 with automatic charging. If the user 202 has set the automatic charging mode to at least one charging station 208, the computing device 100 proceeds to operation 404.

At operation 404, the computing device 100 compares the user's 202 current geographical location with the geographical location of the favorite charging stations 208 and checks if a favorite charging station 208 is within the given range.

The given range may be a predetermined distance of, for example, 100 meters. The range may be given by the user 202, or it may be pre-set.

If the charging station 208 determined by the user 202 is detected to be located within the given range, at operation 406 the computing device 100 sends an authorized start-command to the charging station 208 to set a charging mode.

At operation 408, the computing device 100 notifies the user with a notification that charging will be started, the notification providing the user 202 a possibility to opt out. The notification may be shown, for example, on a screen of the computing device 100 or infotainment system of the electric vehicle. The notification may comprise information indicating that the charging mode is started in a predetermined time. The predetermined time may be, for example, 30 seconds or 5 minutes. If an input from the user 202 is received in response to the notification, the computing device 100 may be configured to cancel the start-command.

In an embodiment, if no charging event has started at the charging station 208 in the predetermined time, the automatic charging mode may be cancelled. The charging event may refer to a user connecting a charging cable to an electric vehicle or driving an electric vehicle on top of a wireless charging spot. In an embodiment, the notification may be sent before sending the authorized start-command to the charging station 208. In the embodiment, the computing device 100 may be configured to not set the charging mode if the user input is received. The user input may be received, for example, when the user 202 presses a virtual or a physical button on the screen, taps the screen, gives a voice command, or when the user logs out from an application program running on the computing device 100.

When the user 202 arrives to the charging station 208 and starts the charging event, for example by connecting the charging cable to the electric vehicle, the charging will be started automatically, since the user 202 has been automatically authorized in the background by the computing device 100. Thus, charging may be started without any user interaction for authentication or other processes required to start charging operations at charging stations. For example, the user is not required to make any selection at the charging station, such as to push a button at the station or on a mobile application to start charging. Further, the user does not need to provide identification means at the station, as the authentication may be processed in the background based on the tracked location information of the user 202. The user may simply drive to a charging station and start charging without any input required from the user to start the charging mode.

The embodiment may provide a convenient and secure solution for enabling automatic charging. Further, no special hardware is required. The illustrated solution is applicable with all different existing electric vehicle charging stations and electric vehicles from different manufacturers. For example, the commands may be sent using internet-based communications comprising at least one of open charge point protocol (OCPP), open smart charging protocol (OSCP) and different protocols of the different manufacturers.

Figure 6:
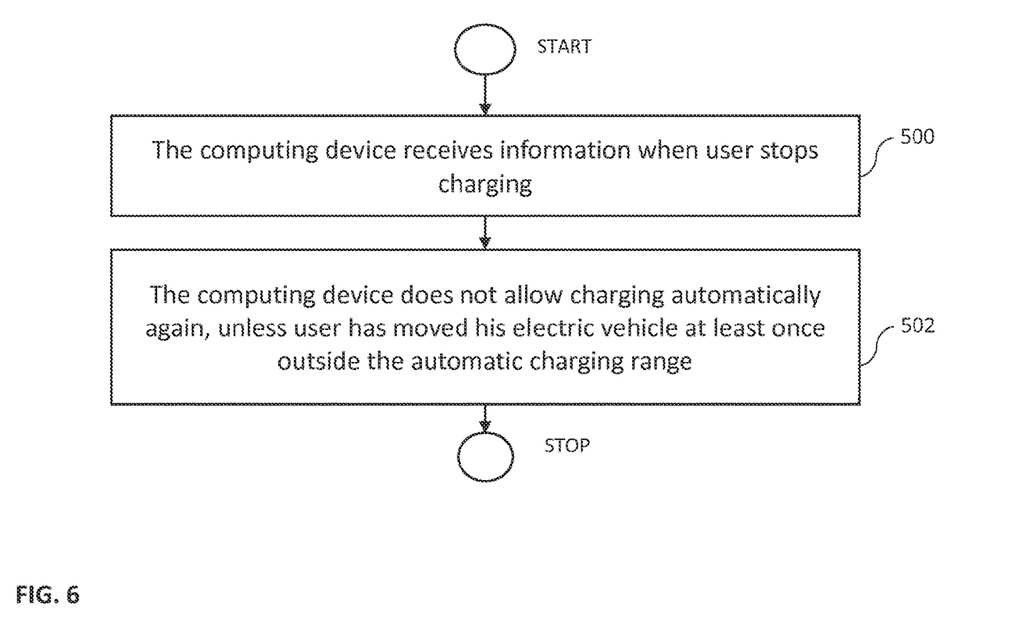
FIG. 6 illustrates a schematic representation of a program flow of a computing device when a user stops charging according to an embodiment.

FIG. 6 illustrates a schematic representation of a program flow of a computing device 100 when a user 202 stops charging according to an embodiment.

At operation 500, the computing device 100 receives information when the user stops charging. The information may be received, for example, from a charging station 208 in response to the user 202 disconnecting a charging cable from his electric vehicle at the charging station 208.

At operation 502, the computing device 100 does not allow charging automatically again, unless the user 202 has moved his electric vehicle at least once outside the set automatic charging range. The user 202 needs to drive outside the predetermined distance from the charging station before the computing device 100 may again send the authorized start-command. This may prevent the authorized start-command to be sent again while the electric vehicle is still parked or driving away from the charging station 208 after charging. The embodiment may further provide security, as misuse of the automatic charging mode is prevented by setting the charging mode only on the charging stations 208 determined by the user, and when detecting that the user 202 has arrived in the vicinity of the charging station 208.

The exemplary embodiments and aspects can be included within any suitable device, for example including servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include a computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the disclosure. For example, it is expressly intended that all combinations of those elements and/or method operations which perform substantially the same function in substantially the same way to achieve the same results are within the scope of the disclosure. Moreover, it should be recognized that structures and/or elements and/or method operations shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A computing device comprising at least one processor and at least one memory, wherein the at least one memory comprises program instructions which, when executed on the at least one processor, cause the computing device to:
store user-specific data comprising information configured to set an automatic charging mode to at least one electric vehicle charging station determined by the user in the memory, the information comprising geographical coordinates of the at least one electric vehicle charging station and a predetermined distance determined by the user for the electric vehicle charging station for allowing sending an authorized start-command automatically to the charging station to set the charging mode for the user, in which charging mode charging starts automatically when an electric vehicle is connected wirelessly or through a charging cable to the electric vehicle charging station;
track geographical coordinates of the user based on geographical information received from a device of the user;
detect when the user is within the predetermined distance from the at least one electric vehicle charging station by comparing the geographical coordinates of the user and the geographical coordinates of the at least one electric vehicle charging station;
notify the user with a notification that the charging mode will be set to the at least one electric vehicle charging station;
send the authorized start-command automatically to the at least one electric vehicle charging station in response to detecting the user within the predetermined distance from the at least one electric vehicle charging station to set the charging mode for the user;
receive information when a charging operation has stopped at the at least one electric vehicle charging station after the charging mode is set;
after the information is received, cancel the charging mode; and
after the charging mode is canceled, determine that the user has at least once moved outside the predetermined distance from the at least one electric vehicle charging station before sending a new start command.

2. The computing device of claim 1, further configured to:
send a command to cancel the charging mode when an input from the user is received in response to the notification.

3. The computing device of claim 1, wherein the authorized start-command is sent if no user input is received in response to the notification within a predetermined time limit.

4. The computing device of claim 1, further configured to:
send a command to cancel the charging mode when no electric vehicle has started charging at the electric vehicle charging station within a predetermined time limit.

5. The computing device of claim 1, wherein the notification comprises information that automatic charging is started in a predetermined time and an option to cancel the charging mode.

6. The computing device of claim 1, wherein the at least one electric vehicle charging station is determined from a list stored in the memory, the list comprising a plurality of available electric vehicle charging stations.

7. The computing device of claim 1, configured to:
receive an input from the user to add or remove at least one electric vehicle charging station to or from the stored user-specific data.

8. The computing device of claim 1, wherein the user-specific data further comprises additional parameters to allow the charging mode on the at least one electric vehicle charging station, the additional parameters comprising the predetermined time limit for the charging mode.

9. The computing device of claim 1, wherein the commands are sent using internet-based communications comprising at least one of open charge point protocol, OCPP, open smart charging protocol, OSCP, and protocols of different manufacturers.

10. The computing device of claim 1, wherein the coordinates are compared at predetermined intervals.

11. The computing device of claim 1, wherein the computing device is configured to track the geographical coordinates of the user using a GNSS tracking unit of at least one of the electric vehicle of the user, a wearable of the user and the computing device.

12. An electric vehicle charging system comprising:
at least one electric vehicle charging station communicatively coupled to a computing device, the computing device comprising at least one processor and at least one memory, wherein the at least one memory comprises program instructions which, when executed on the at least one processor, cause the computing device to:
store user-specific data comprising information configured to set automatic charging mode to at least one electric vehicle charging station determined by the user in a memory, the information comprising geographical coordinates of the at least one electric vehicle charging station and a predetermined distance determined by the user for the electric vehicle charging station for allowing sending an authorized start-command automatically to the charging station to set a charging mode for the user, in which charging mode charging starts automatically when an electric vehicle is connected wirelessly or through a charging cable to the electric vehicle charging station;
track geographical coordinates of the user based on geographical information received from a device of the user;
detect when the user is within the predetermined distance from the at least one electric vehicle charging station by comparing the geographical coordinates of the user and the geographical coordinates of the at least one electric vehicle charging station;
notify the user with a notification that the charging mode will be set to the at least one electric vehicle charging station;
send the authorized start-command automatically to the at least one electric vehicle charging station in response to detecting the user within the predetermined distance from the at least one electric vehicle charging station to set the charging mode for the user;
receive information when a charging operation has stopped at the at least one electric vehicle charging station after the charging mode is set;
after the information is received, cancel the charging mode; and
after the charging mode is canceled, determine that the user has at least once moved outside the predetermined distance from the at least one electric vehicle charging station before sending a new start command.

13. A method, the method comprising:
storing user-specific data comprising information configured to set automatic charging mode to at least one electric vehicle charging station determined by the user in a memory, the information comprising geographical coordinates of the at least one electric vehicle charging station and a predetermined distance determined by the user for the electric vehicle charging station for allowing sending an authorized start-command automatically to the charging station to set a charging mode for the user, in which charging mode charging starts automatically when an electric vehicle is connected wirelessly or through a charging cable to the electric vehicle charging station;
tracking geographical coordinates of the user based on geographical information received from a device of the user;
detecting when the user is within the predetermined distance from the at least one electric vehicle charging station by comparing the geographical coordinates of the user and the geographical coordinates of the at least one electric vehicle charging station;
notifying the user that the charging mode will be set to the at least one electric vehicle charging station;
sending the authorized start-command automatically to the at least one electric vehicle charging station in response to detecting the user within the predetermined distance from the at least one electric vehicle charging station to set the charging mode for the user;
receiving information when a charging operation has stopped at the at least one electric vehicle charging station after the charging mode is set;
after the information is received, canceling the charging mode; and
after the charging mode is canceled, determining that the user has at least once moved outside the predetermined distance from the at least one electric vehicle charging station before sending a new start command.

14. A non-volatile computer readable medium comprising program instructions configured to, when executed on a computing device, cause the computing device to perform the method of claim 13.

* * * * *